July 29, 1958 K. M. FEIERTAG 2,845,198
ELECTRICAL TERMINAL BOX AND COVER THEREFOR
Filed Aug. 26, 1954
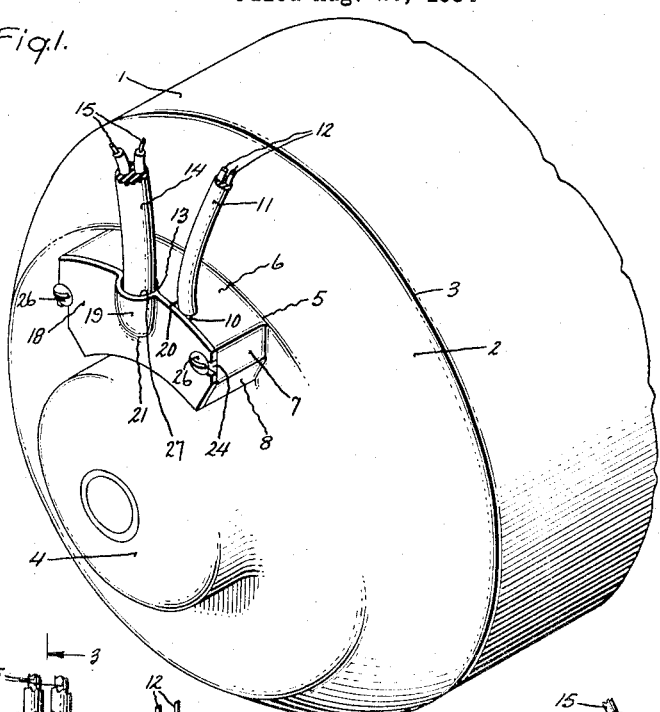
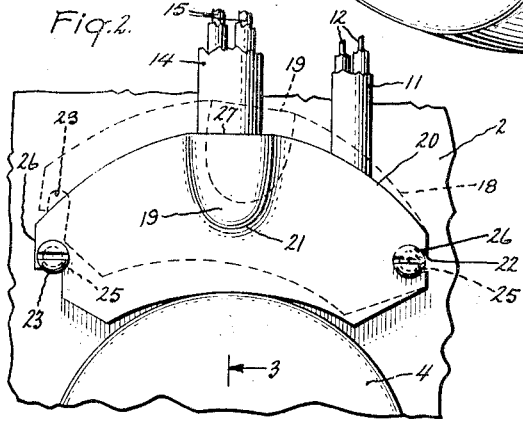
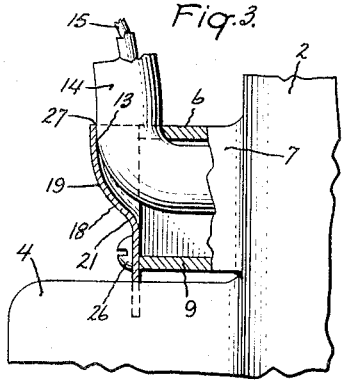
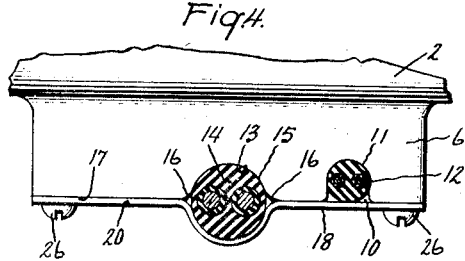
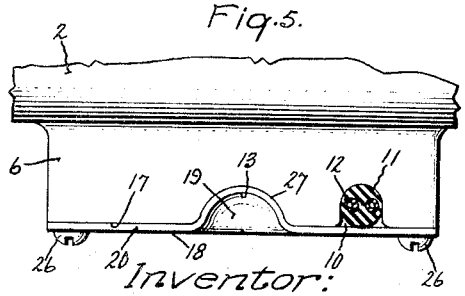
Inventor:
Karl Martin Feiertag,
by His Attorney.

United States Patent Office 2,845,198
Patented July 29, 1958

2,845,198

ELECTRICAL TERMINAL BOX AND COVER THEREFOR

Karl M. Feiertag, Fort Wayne, Ind., assignor to General Electric Company, a corporation of New York Application August 26, 1954, Serial No. 452,393

1 Claim. (Cl. 220—3.8)

This invention relates to electrical terminal boxes, and more particularly to electrical terminal boxes adapted to receive a varying number of electrical leads.

Electrical terminal boxes are used for a great variety of electrical equipment, and each different item may require a particular number of electrical leads connected thereto. While it is economically desirable to provide a single type of terminal box which may be used on different types of equipment, such a goal should be achieved without leaving unsightly empty openings where the equipment uses a smaller number of leads. Such openings are poor from an appearance viewpoint, permit possible entry of dirt, water, and other harmful substances, and tend to induce accidents by virtue of the fact that a person may, for instance, put a finger through the opening and sustain injury from contact with rotating machinery or with current-carrying elements. The desirability of a standardized terminal box is particularly high in the field of dynamoelectric machines, where machines having housing and bearing structures which are exactly alike may be utilized for totally different functions requiring different numbers of leads thereto. For instance, in one application a motor may be used merely for driving a mechanism while in another a motor having the same housing and bearing structure may also have the auxiliary function of controlling the actuation of a separate piece of apparatus. In the second instance it will be obvious that at least two additional electrical conductors must be connected to the motor. It will be seen that in instances such as that given above it is desirable to provide a terminal box which may be utilized with either machine without leaving undesirable openings such as those described above.

It is, therefore, an object of this invention to provide a terminal box and a cover therefor which will incorporate the improvements and advantages set forth above.

Further objects and advantages of this invention will become apparent and the invention will be better understood by reference to the following description and the accompanying drawing, and the features of novelty which characterize this invention will be pointed out with particularity in the claim annexed to and forming a part of this specification.

This invention, in its broadest aspect, provides an electrical terminal box with an opening therein and a cover member adapted to be secured to the box. The box has a recess formed at the edge of the opening and the cover member has a portion of its periphery formed into substantially the same shape as the periphery of the recess. When the cover member is secured to the box with one side theretoward, the recess and the cover portion together will form a lead-receiving opening. When the cover portion is turned around so that the other side faces toward the box, the cover portion will nest in the recess when the cover is secured to the box so that the lead-receiving opening will be covered. By this means, the same type of terminal box may be used whether an extra lead is needed or not. The only difference will occur in the assembly: if an extra lead is required, one face of the cover will be toward the box; if the extra lead is not required, the other face of the cover will be toward the box.

In the drawing:

Figure 1 is a fragmentary view in perspective of a dynamoeletcric machine having the improved terminal box formed at one end thereof;

Figure 2 is a fragmentary end view of the machine showing the improved terminal box and cover;

Figure 3 is a fragmentary view, partly in cross section, along line 3—3 of Figure 2;

Figure 4 is a top view, partly in cross section, of the invention; and

Figure 5 is the same view as Figure 4, with the improved terminal box cover reversed for use with a machine which does not require as many leads as the machine of Figure 1.

Referring now to the figures of the drawing, there is shown a housing 1 for a dynamoelectric machine (not further shown). An end shield member 2 which may be substantially circular, as shown, engages housing 1 along line 3 and is provided with a hub structure 4 adapted to receive a bearing not shown. Housing 1 and end shield 2 may be cast or formed in any other desired manner. Formed integrally with the end shield, there is provided a terminal box, generally indicated at 5, having an outer surface or wall 6, side surfaces or walls 7 and 8 on each side respectively, and an inner surface or wall 9. The terms "outer and inner" for walls 6 and 9 respectively are used in this instance with respect to the radial distance from the center of end shield member 2. A recess 10 is provided in outer wall 6 to receive a cable or lead 11 which contains electrical conductors 12. Recess 10 may be of any preferred shape to accommodate cable 11 and maintain it in the desired position. Outer wall 6 is also provided with a recess 13, substantially midway between the opposite sides formed by surfaces 7 and 8, which accommodates part of a cable or lead 14 containing conductors 15. Recess 13 is preferably given a substantially semi-circular shape, with the edges 16 thereof being curved to blend into front 17 of wall 6 as shown. A cover member 18, preferably flat and of substantially the same shape as the opening formed by walls 6, 7, 8 and 9, is provided with a portion 19, curved out of the plane of the remainder of the cover member. Portion 19 at outer edge 20 of the cover, has a semi-circular shape, indicated at 27, similar to that of recess 13, and is located substantially midway between the ends of edge 20 of cover member 18.

Referring particularly for a moment to Figure 3 it will be seen that of the shape of portion 19 preferably varies from a maximum at outer edge 20 of the cover, and diminishes until it curves back, as at 21, into the plane of the rest of cover member 18. The similarity in shape of portion 19 at 27, and of recess 13 in outer surface 6 may best be observed by reference to Figure 4.

Cover member 18 is provided with a pair of slots 22 and 23 which may, as shown, be at right angles to each other. Box 5 may be provided with inwardly extending portions, such as 24, each having an opening 25 formed therein. Cover member 18 may then be secured to terminal box 5 by any desired means, such as bolts 26, which are secured within slots 22 and 23 respectively of cover 18, and within openings 25 respectively in box 5. It will be observed that the arrangement of slots 22 and 23 perpendicular to each other permits access to the box 5 without complete removal of bolts 26 since it is merely necessary to loosen each of the bolts and then pivot the left end of cover 18 (as seen in Figure 2) about the right hand bolt 26 as a pivot point.

When cover 18 is secured to box 6 so that portion 19 curves away from the box as in Figures 1, 2, 3, and 4, recess 13 and curved portion 19 together form an opening which accommodates cable 14. In addition, of course, the flat part of cover 18 maintains cable 11 in its recess 10.

In those instances where the terminal box 5 is used in connection with dynamoelectric machines which are not required to control another piece of apparatus, only cable 11 will be required, and cable 14 will be omitted. If the construction of the first four figures were maintained, an unsightly opening would be left, formed by recess 13 in outer surface 6 and curved portion 19 of cover 18. To avoid this result and still be able to use the same terminal box and cover structure, the cover 18 is secured to box 5, as shown in Figure 5, in precisely the opposite fashion, with curved portion 19 of cover 18 extending into recess 13 to close it. It will be seen from Figure 5 that portion 19 and recess 13 may be so formed that they will nest exactly and that no opening whatsoever will be left between them.

It will be seen from the foregoing that this invention provides a terminal box and a cover member therefor which permit the use of the same structure on different apparatus where one item may require an addition cable, and that whichever item is used the terminal box will present a neat appearance and will have no undesirable openings.

It will be apparent that certain features set forth above are for illustrative purposes, and that variations therefrom may be effected without impairing the efficacy of the invention. These include, for instance, the means for securing the cover to the terminal box, the making of the terminal box integral with the apparatus or merely secured thereto, the exact number of lead-receiving openings involved, and the precise shape of the terminal box and cover. In addition, it will be apparent that the use of such a terminal box is not restricted to dynamoelectric machines but may be used in other instances where two different products have a different number of leads extending thereto and it is desired to use but one type of terminal box therefor. Therefore, while this invention has been explained by describing a particular embodiment thereof, it will be apparent that improvements and modifications may be made without departing from the scope of the invention as defined in the appended claim.

What I claim as new and desire to secure by Letters Patent of the United States is:

An electrical terminal box having a plurality of joined walls defining a box opening, at least one of said walls having formed therein an aperture adapted to receive an electrical conductor, at least one of said walls having a substantially semi-circular recess of predetermined diameter formed therein approximately midway between the ends thereof and at the edge of said opening, and a substantially flat cover member for said box adapted to be secured thereto to cover said box opening, said cover member having a shape substantially corresponding to the shape of said box opening, and having at least one portion curved out of the plane of said cover member, said cover portion having a substantially semicircular cross-section at the edge of said cover member and having a curved cross-section of diminishing scope as the distance from said cover member edge increases, said portion being formed at approximately the midpoint of said cover member edge, said recess and said cover portion at said edge of the cover member having substantially the same diameter and forming together a lead-receiving opening when one side of said cover member is faced toward said box opening, the remainder of said cover portion then being adapted to accommodate part of said lead, said semi-circular cover portion at the edge of said cover member nesting in said recess and sealing said recess when the other side of said cover member is faced toward said box.

References Cited in the file of this patent

UNITED STATES PATENTS

| | | |
|---|---|---|
| 767,163 | Neuberth | Aug. 9, 1904 |
| 892,220 | Burns | June 30, 1908 |

FOREIGN PATENTS

| | | |
|---|---|---|
| 14,848 of 1913 | Great Britain | May 29, 1914 |
| 542,433 | Germany | Jan. 23, 1932 |